(12) United States Patent
Gao et al.

(10) Patent No.: US 12,706,716 B2
(45) Date of Patent: Aug. 11, 2026

(54) CHANNEL STATE INFORMATION (CSI) CODEBOOK FOR COHERENT JOINT TRANSMISSION (CJT)

(71) Applicant: ZTE Corporation, Shenzhen (CN)

(72) Inventors: Bo Gao, Shenzhen (CN); Zhaohua Lu, Shenzhen (CN); Shujuan Zhang, Shenzhen (CN); Wenjun Yan, Shenzhen (CN); Minqiang Zou, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 288 days.

(21) Appl. No.: 18/522,118

(22) Filed: Nov. 28, 2023

(65) Prior Publication Data

US 2024/0171350 A1 May 23, 2024

Related U.S. Application Data

(63) Continuation of application No. PCT/CN2022/108749, filed on Jul. 28, 2022.

(51) Int. Cl.
*H04L 5/00* (2006.01)
*H04B 7/0417* (2017.01)
*H04B 7/06* (2006.01)

(52) U.S. Cl.
CPC ......... *H04L 5/0051* (2013.01); *H04B 7/0417* (2013.01); *H04B 7/0626* (2013.01); *H04B 7/0628* (2013.01); *H04L 5/0035* (2013.01)

(58) Field of Classification Search
CPC ... H04L 5/0051; H04L 5/0035; H04B 7/0417; H04B 7/0626; H04B 7/0628
See application file for complete search history.

(56) References Cited

U.S. PATENT DOCUMENTS 11,121,752 B2 9/2021 Wei et al.
11,863,494 B2 * 1/2024 Wu ...................... H04B 7/0695
(Continued)

FOREIGN PATENT DOCUMENTS

CN 108496400 A 9/2018
WO 2020147025 A1 7/2020
(Continued)

OTHER PUBLICATIONS

Canadian office action issued in CA Patent Application No. 3,221,662, dated Jan. 30, 2025, 4 pages.
(Continued)

*Primary Examiner* — Duc C Ho
(74) *Attorney, Agent, or Firm* — Ashurst Perkins Coie US LLP

(57) ABSTRACT

Disclosed are methods, apparatuses, and systems for wireless communications including techniques for improving the performance of multiple transmission-reception points. In one aspect, a method of wireless communications is disclosed. The method includes receiving, at a wireless device, a report configuration associated with a reference signal (RS). The method further includes determining channel state information, wherein the channel state information comprises at least one of: a RS indicator, a rank indicator (RI), a precoding matrix indicator (PMI), or a channel quality index (CQI), and reporting the channel state information to a network node.

16 Claims, 9 Drawing Sheets

600

Receiving, at a wireless device, a report configuration associated with a reference signal (RS) — 610

Determining channel state information, wherein the channel state information comprises at least one of: a RS indicator, a rank indicator (RI), a precoding matrix indicator (PMI), or a channel quality index (CQI) — 620

Reporting the channel state information to a network node — 630

(56) References Cited

U.S. PATENT DOCUMENTS

2020/0036555 A1 1/2020 Davydov
2021/0359745 A1 * 11/2021 Farag .................... H04L 1/0071
2022/0094504 A1 3/2022 Wu et al.
2022/0200666 A1 * 6/2022 Lee ........................ H04B 7/024
2023/0058460 A1 * 2/2023 Huang ................. H04B 7/0639
2023/0232340 A1 * 7/2023 Shahmohammadian .................... H04W 52/242 455/522
2023/0254718 A1 * 8/2023 Rahman ................ H04L 5/0035 370/252

FOREIGN PATENT DOCUMENTS

WO 2021160180 A1 8/2021
WO 2021161220 A1 8/2021

OTHER PUBLICATIONS

International Search Report in International Application No. PCT/CN2022/108749, mailed on Dec. 21, 2022, 9 pages.
Mediatek Inc., "CSI enhancement for NCJT and FR1 FDD reciprocity," 3GPP TSG RAN WG1 #105e, R1-2105368, e-Meeting, May 19-27, 2021, 12 pages.
Lenovo, "CSI enhancements for high mobility and coherent JT," 3GPP TSG RAN WG1 #109-e, R1-2204164, e-Meeting, May 9-20, 2022, 11 pages.
OPPO, "CSI enhancement for high/medium UE velocities and coherent JT," 3GPP TSG RAN WG1 #109-e, R1-2203955, e-Meeting, May 9-20, 2022, 7 pages.
Samsung, "NR MIMO evolution for downlink and uplink," Status Report to TSG, 3GPP TSG RAN Meeting #96, RP-221393, Budapest, Hungary, Jun. 6-9, 2022, 21 pages.
Mediatek Inc., "CSI enhancement for high/medium UE velocities and coherent JT," 3GPP TSG RAN WG1 #109-e, R1-2204691, e-Meeting, May 9-20, 2022, 19 pages.
Nokia et al., "CSI enhancement for high/medium UE velocities and CJT," 3GPP TSG RAN WG1 Meeting #109-e, R1-2204540, e-Meeting, May 9-20, 2022, 30 pages.
LG Electronics, "SRS enhancement targeting TDD CJT and 8 TX operation," 3GPP TSG RAN WG1 #109-e, R1-2204145, e-Meeting, May 9-20, 2022, 5 pages.
CATT, "On Rel-18 CSI enhancements," 3GPP TSG RAN WG1 #109-e, R1-2203443, e-Meeting, May 9-20, 2022, 10 pages.
LG Electronics, "Potential CSI enhancement for high/medium UE velocities and coherent JT," 3GPP TSG RAN WG1 #109-e, R1-2204143, e-Meeting, May 9-20, 2022, 6 pages.
Intel Corporation, "CSI Enhancements for Rel-18 NR," 3GPP TSG RAN WG1 #109-e, R1-2204787, e-Meeting, May 9-20, 2022, 7 pages.
European Search Report issued in EP Patent Application No. 22942953.5, dated Oct. 24, 2024, 14 pages.
Canadian office action issued in CA Patent Application No. 3,221,662, dated Nov. 26, 2025, 4 pages.
Korean office action issued in KR Patent Application No. 10-2023-7041322, dated Jul. 30, 2025, 6 pages. English translation included.
Korean notice of allowance issued in KR Patent Application No. 10-2023-7041322, dated May 22, 2026, 8 pages. English translation included.

* cited by examiner

400

Figure 7:
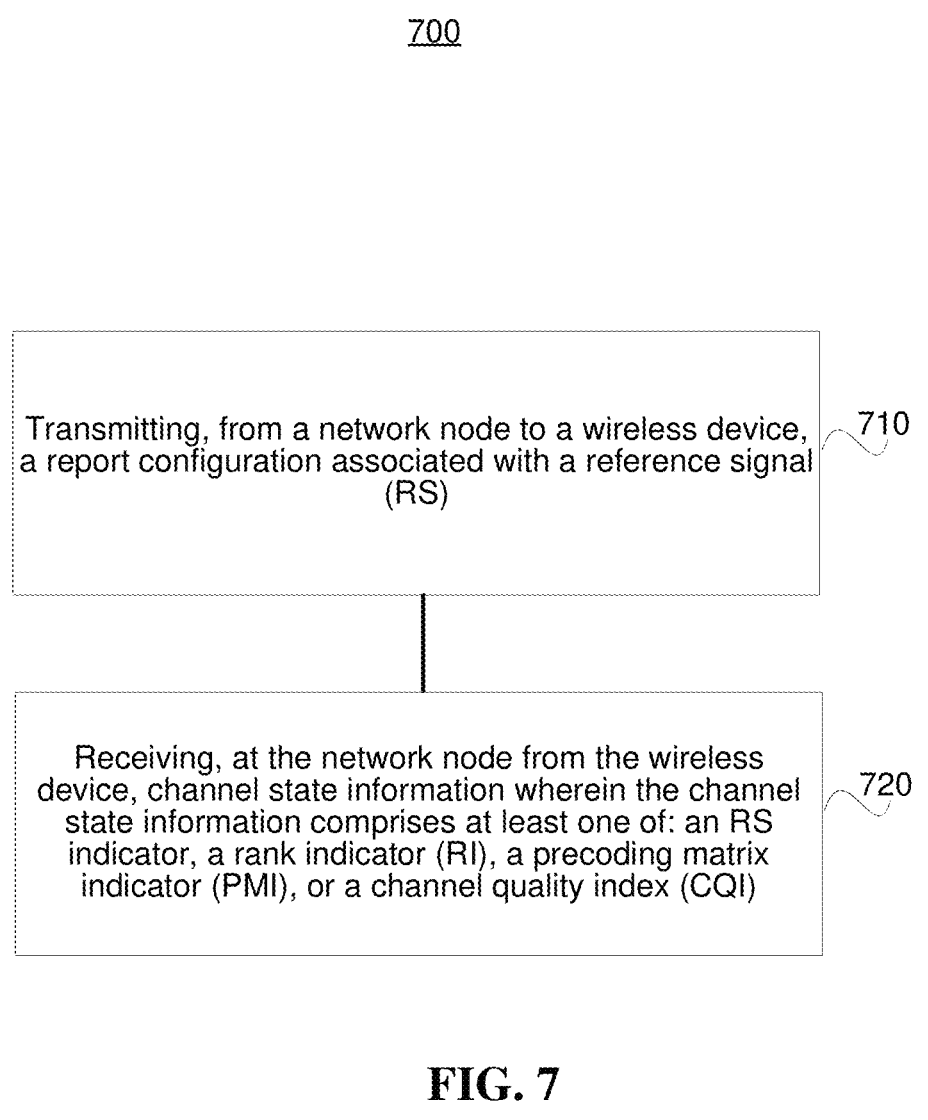

700

Transmitting, from a network node to a wireless device, a report configuration associated with a reference signal (RS)

710

Receiving, at the network node from the wireless device, channel state information wherein the channel state information comprises at least one of: an RS indicator, a rank indicator (RI), a precoding matrix indicator (PMI), or a channel quality index (CQI)

CHANNEL STATE INFORMATION (CSI) CODEBOOK FOR COHERENT JOINT TRANSMISSION (CJT)

CROSS-REFERENCE TO RELATED APPLICATIONS

This application is a continuation of International Patent Application No. PCT/CN2022/108749, filed on Jul. 28, 2022, the contents of which are incorporated herein by reference in their entirety.

TECHNICAL FIELD

This patent document is directed to wireless communications.

BACKGROUND

One or both ends of a wireless communications system can use one or multiple transmission-reception points (TRPs). For example cellular 5G allows for single TRP transmission and multi-TRP (mTRP) transmission. The latter can obtain some performance gain over single TRP transmission, especially for cell-edge wireless devices. New techniques are needed to improve the performance of multi-TRP systems as well as single TRP systems.

SUMMARY

Disclosed are methods, apparatuses, and systems for wireless communications including techniques for improving the performance of multiple transmission-reception points.

In one aspect, a method of wireless communications is disclosed. The method includes receiving, at a wireless device, a report configuration associated with a reference signal (RS). The method further includes determining channel state information, wherein the channel state information comprises at least one of: a RS indicator, a rank indicator (RI), a precoding matrix indicator (PMI), or a channel quality index (CQI), and reporting the channel state information to a network node.

In another aspect, another method of wireless communications is disclosed. The method includes transmitting, from a network node to a wireless device, a report configuration associated with a reference signal (RS). The method further includes receiving, at the network node from the wireless device, channel state information wherein the channel state information comprises at least one of: an RS indicator, a rank indicator (RI), a precoding matrix indicator (PMI), or a channel quality index (CQI).

BRIEF DESCRIPTION OF THE DRAWINGS

FIG. 7 shows another example of a process; and

DETAILED DESCRIPTION

Section headings are used in the present document to improve readability and do not limit scope of the disclosed embodiments and techniques in each section to only that section. Certain features are described using 3GPP terminology but may be practices in other wireless systems that use other wireless communication protocols.

One or both ends of a wireless communications system can use one or multiple transmission-reception points (TRPs). For example cellular 5G allows for single TRP transmission and multi-TRP (mTRP) transmission with non-coherent joint transmission (NC-JT). The latter can obtain some performance gain over single TRP transmission, especially for cell-edge UE. Although having the advantage of low-implementation complexity, NC-JT may have some throughput degradation compared with coherent joint transmission (CJT). CJT can obtain optimal performance for multi user multiple input multiple output (MU-MIMO) using mTRP. A TRP is also referred to herein as a 'transmission resource group'.

In order to support CJT (especially for frequency division duplexing (FDD)), disclosed is a channel state information (CSI) codebook and reporting procedure for CJT. Specifically, the following issues are resolved by the disclosed subject matter:

1) To support different types of multi-TRP architectures, we need to consider a flexible RS configuration for distinguishing TRP(s) (for instance, TRPs sharing same FD-basis (e.g., different sectors in the same site) or not). Then, the RS configuration may be also relevant to transmission hypotheses indication from gNB side for flexible report (from single and multiple TRP(s) in CJT).
2) In order to determine DL precoding in MU-MIMO, the ideal scheme for zero-forcing or signal-leakage-to-noise ratio (SLNR) need to have the whole channel property rather than right eigenvector (corresponding to gNB side), the UE receiver side information by per RX reporting or per layer, i.e., information related to the left singular matrix U of the channel, $H=U\Sigma V^H$, should be considered.
3) After that, for multi-TRP case, there may be up to 4 or more TRP operation for CJT. Therefore, for transmission perspective, the UE may provide CSI (e.g., comprising PMI) corresponding to different hypothesis, e.g., sTRP, 2-TRP, 3-TRP or more for serving CJT. Therefore, how to determine the transmission power from gNB side and hypothesis should be further considered.

Figure 1:
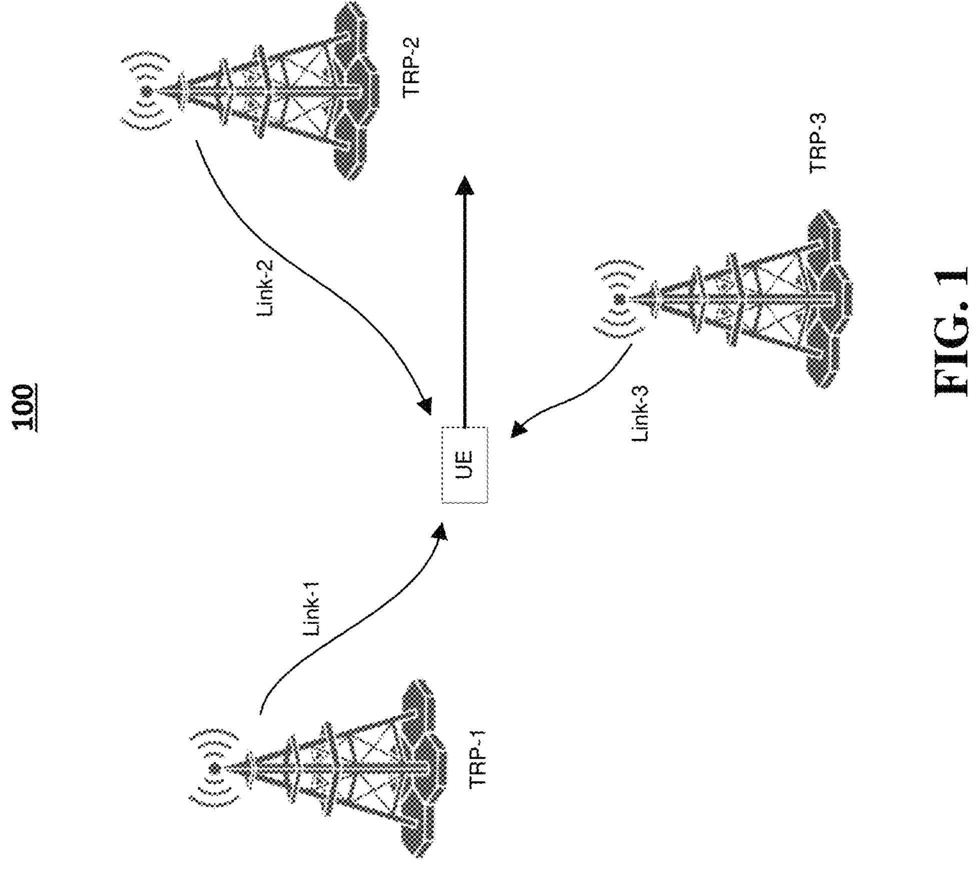
FIG. 1 shows an example diagram of a multi-transmission-reception point (TRP) based transmission for serving a wireless device.

As the expense of wide or ultra-wide spectrum resources and massive or large-massive MIMO in a single TRP site, multi-TRP operation should be considered as an emerging technique for balancing the deployment cost and throughput/robustness. As shown in FIG. 1, an example for multi-TRP operation is provided accordingly. In such case, especially for FDD or cell-edge UE in TDD, CSI information (involving PMI, RI, CQI, etc.) for determining DL precoding should be reported from UE to gNB, and even for a single layer (or a DMRS port) the precoding is provided across DL Tx antennas from multi-TRP accordingly.

Figure 2:
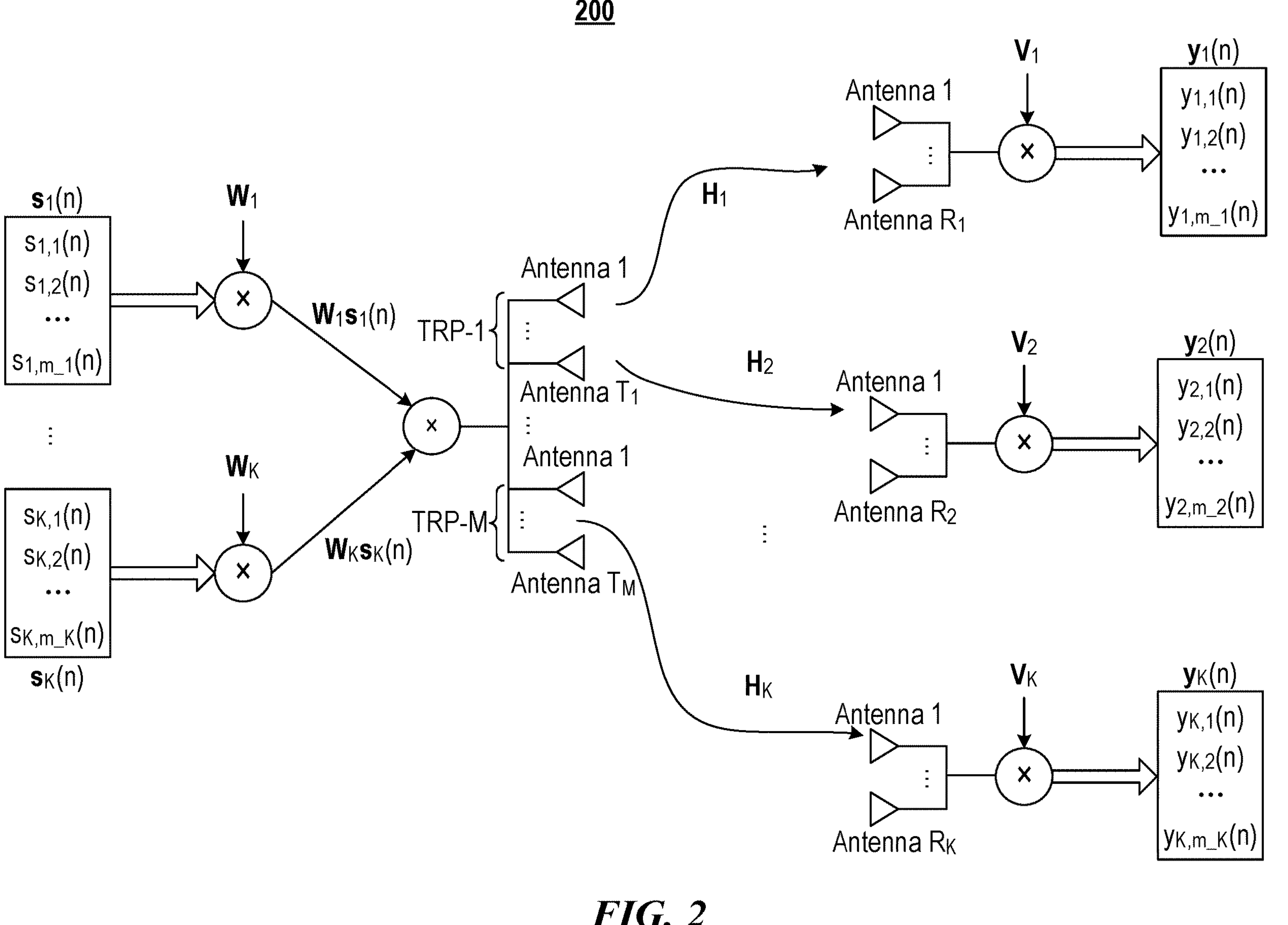
FIG. 2 shows an example diagram of joint precoding across different TRPs for coherent joint transmission (CJT) transmission.

For MU-MIMO in CJT, we have the following diagram for depicting the transmission scheme as shown in FIG. 2. In order to achieve an ideal precoding, regardless of zero-forcing or SLNR mechanisms, the complete channel related information H is an essential (especially for subsequent CQI/MCS determination after refining Tx precoding in MU-MIMO). That means that, besides for right eigenvector V in H, left eigenvector U and eigenvalue vector(s) are needed for reconstructing the channels accordingly. For SLNR, we have the following definition:

$$SLNR_i = \frac{Tr(W_i^H H_i^H H_i W_i)}{Tr(W_i^H (M_i \sigma_i^2 + \tilde{H}_i^H \tilde{H}_i) W_i)} \text{ where}$$

$$\tilde{H}_i = [H_1 \ \ldots \ H_{i-1} \ H_{i+1} \ \ldots \ H_K].$$

Then, for S-layer transmission for i-th UE, the precoding information is given by:

$W_i \propto$ max. S eigenvectors $$\left((M_i \sigma_i^2 + \tilde{H}_i^H \tilde{H}_i)^{-1} H_i^H H_i\right)$$

Notes that, in this patent document, a "beam state" is equivalent to quasi-co-location (QCL) state, transmission configuration indicator (TCI) state, spatial relation (also called as spatial relation information), reference signal (RS), spatial filter or pre-coding. Furthermore, in this patent, "beam state" is also called as "beam". Specifically, a) A "Tx beam" is equivalent to a QCL state, TCI state, spatial relation state, DL/UL reference signal (such as channel state information reference signal (CSI-RS), synchronization signal block (SSB) (which is also called as SS/PBCH), demodulation reference signal (DMRS), sounding reference signal (SRS), and physical random access channel (PRACH)), Tx spatial filter or Tx precoding;
b) A "Rx beam" is equivalent to QCL state, TCI state, spatial relation state, spatial filter, Rx spatial filter or Rx precoding;
c) A "beam ID" is equivalent to QCL state index, TCI state index, spatial relation state index, reference signal index, spatial filter index or precoding index.

Specifically, the spatial filter can be either UE-side or gNB-side one, and the spatial filter is also called as spatial-domain filter.

Note that "spatial relation information" includes one or more reference RSs, which is used to represent the same or quasi-co "spatial relation" between targeted "RS or channel" and the one or more reference RSs.

Note that "spatial relation" means the beam, spatial parameter, or spatial domain filter.

Note that a "QCL state" is includes of one or more reference RSs and their corresponding QCL type parameters, where QCL type parameters include at least one of the following aspect or combination: [1] Doppler spread, [2] Doppler shift, [3] delay spread, [4] average delay, [5] average gain, and [6] Spatial parameter. In this patent, "TCI state" is equivalent to "QCL state".

Note that a "time unit" can be sub-symbol, symbol, slot, sub-frame, frame, or transmission occasion.

Note that a "DCI" is equivalent to "PDCCH".

Note that a 'precoding information' is equivalent to a PMI, TPMI, precoding or beam.

Note that a 'TRP' is equivalent to beam state, a RS port, a RS port group, a RS resource, a RS resource group or a RS resource set. Note that the 'TRP' is equivalent to 'transmission resource group'.

Note that a 'port group' is equivalent to antenna group, or UE port group.

Note that a 'transmission hypothesis' is equivalent to CSI hypothesis, CSI mode, one or more RS port groups for determining CSI, one or more RS resources for determining CSI, or a mode using combination of one or more RS port groups or RS resources for determining CSI.

Example 1

Generally, for CSI codebook/reporting for CJT, we firstly need to provide a mechanism of distinguishing different TRPs from one or more reference signal (RS), like CSI-RS. Then, on the other hand, for interference measurement, non-zero-power (NZP) interference measurement resource (IMR) (NZP-IMR), i.e., a CSI-RS for interference measurement, or ZP-IMR should be configured. Then, we also need to consider how to apply the corresponding interference measurement results for corresponding CSI determination.

After receiving report configuration associated with reference signals (RSs), the UE receives the reference signals according to the configuration, determines CSI, wherein the CSI comprises at least one of RS indication, RI, PMI, and CQI, and then report CSI to gNB side.

- Furthermore, the RS(s) comprise one or more RS resource groups for channel measurement, and one or more IMR for interference measurement. Note: the RS resource group should be assumed as a basis for CSI determination in CJT, and then in a specific case, there may be only one RS resource in the group.
  - In one RS resource group, there may be one or more RS resources, and then in a RS resource, it can comprise one or more port groups according to the report configuration.
    - Furthermore, in a CSI report, SD-basis indication can apply to one port group in a resource, or all port groups in a resource, or all one or more resources.
    - Furthermore, in a CSI reporting, FD-basis indication can apply to one port group in a resource, all port groups in a resource, or all one or more resources.
      - Note: A port group corresponds to a TRP, in such case.
    - Furthermore, as an example, the frequency-domain (FD)-basis indication should be resource-wise, and then spatial domain (SD)-basis indication should be port-group wise.
      - Through flexible configuration for indicating port groups in a resource (e.g., the number of port groups in a resource, which may be apply to all resources in the group), gNB can indicate FD-basis or SD-basis is TRP-specific, TRP-common or TRP-group-specific.
    - Furthermore, the port group is configured according to a parameter of the number of port groups (e.g., Ng), or a combination of the number of port groups (Ng) and the number of first domain ports (N1) and the number of second domain ports (N2), like {Ng, N1, N2}. It should be noticed that N1*N2 is the number of ports in a port group.

Then the parameter can be configured per RS resource or in a RS resource set.

Furthermore, in the case that the parameter is configured in resource level, the parameter (e.g., Ng, N1, and/or N2) should be the same for RS in a RS resource set or RS resource group.

For sake of presentation, in this application, the TRP is equivalent to a resource group, comprising a RS port, a RS port group, RS resource, or a RS resource set.

For instance, there are N TRPs, and then the precoding matrix for CJT though CSI report can be represented as follows.

$$W_t^l = \begin{bmatrix} w_0^l \\ w_1^l \\ \vdots \\ w_j^l \\ \vdots \\ w_{N-1}^l \end{bmatrix}$$

where precoding matrix $$w_j^l$$

denotes j-th TRP related precoding matrix. Then we have $$w_j^l = \begin{bmatrix} w_{0,j}^l \\ w_{1,j}^l \end{bmatrix} = \frac{1}{\beta_{l,j}} \begin{bmatrix} \sum_{i=0}^{L_j-1} v_{i,j} p_{l,0,j}^{(1)} p_{l,j}^{(3)} \varphi_{l,j}^{(2)} y_{l,j}^{(1)} \sum_{f=0}^{M_j-1} y_{l,f,j} p_{l,i,f,j}^{(2)} \varphi_{l,i,f,j} \\ \sum_{i=0}^{L_j-1} v_{i,j} p_{l,1,j}^{(1)} p_{l,j}^{(3)} \varphi_{l,j}^{(2)} y_{l,j}^{(1)} \sum_{f=0}^{M_j-1} y_{l,f,j} p_{l,i+L,f,j}^{(2)} \varphi_{l,i+L,f,j} \end{bmatrix}$$

where $$p_{l,j}^{(3)}, \varphi_{l,j}^{(2)}$$

denotes relative amplitude and co-phase information corresponding to strongest coefficients of j-th TRP over a reference TRP with maximum coefficient across all TRPs, and $$y_{l,j}^{(1)}$$

denotes relative relationship between frequency domain basic vector(s) of j-th TRPs over the reference TRP.

Figure 3:
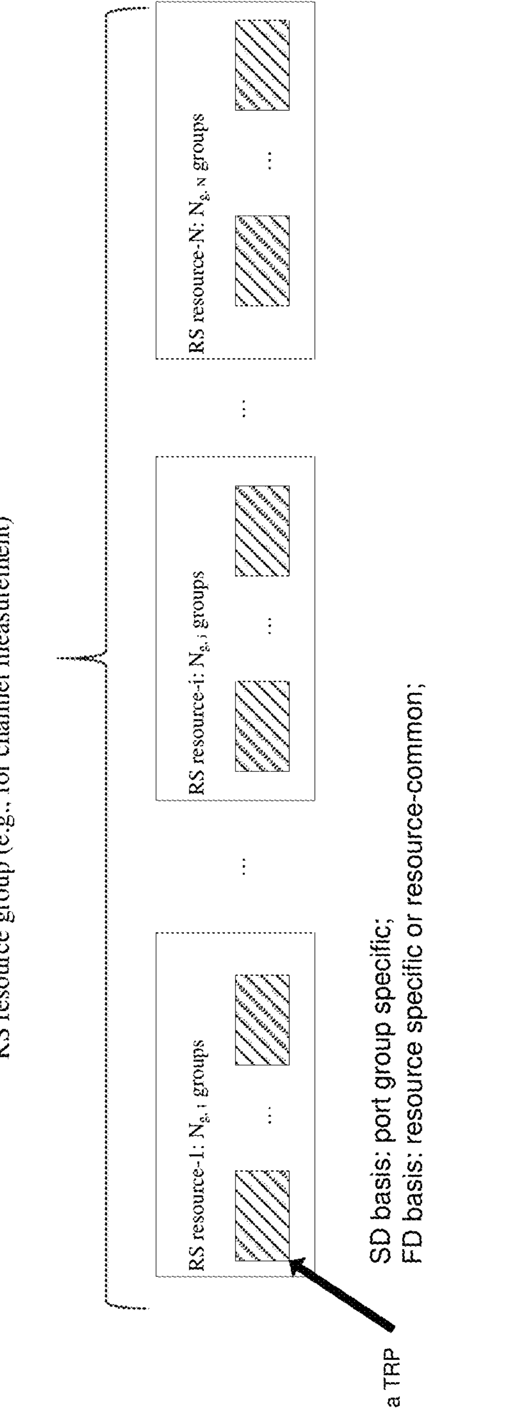
FIG. 3 shows an example diagram of a reference signal (RS) configuration for a CJT channel state information (CSI) report.

For instance, one example for RS configuration for CJT is shown in FIG. 3, where each of port groups corresponds to a TRP (e.g., having an independent SD-basis indication, e.g., $v_{i,j}$). On the other hand, FD-basis (e.g., $y_{l,f,j}$ in above formula) can be RS resource-specific or RS resource-common. For simplifying configuration and/or implementation complexity, there is the same Ng parameter value for each of resources in the RS resource group.

In order to determining DL precoding in MU-MIMO (as mainly target case for this CJT transmission), the ideal scheme for zero-forcing or signal-leakage-to-noise ratio (SLNR) need to have the whole channel property rather than right eigenvector-only (corresponding to gNB side), the UE receiver side information by per RX reporting or per layer should be considered. Specifically, the receiver side information comprises a receiver precoding information (e.g., UE-side receiver precoding (e.g., for PDSCH reception/demodulation), or left singular matrix U (i.e., related to a channel or CSI reference resource)) or the eigenvalue(s) Σ.

In Example #2, the details about the report of receiver precoding can be found.

In Example #3, the details about the eigenvalue can be found.

Finally, CSI corresponding to different transmission hypothesis can be found in Example 4.

Example 2: CSI Report of UE Receiver Precoding

In order to determining DL precoding in MU-MIMO (as mainly target case for this CJT transmission), the ideal scheme for zero-forcing or signal-leakage-to-noise ratio (SLNR) need to have the whole channel property rather than right eigenvector-only (corresponding to gNB side), the UE receiver side information by per RX reporting or per layer should be considered.

Receiver side information can be reported, where the receiver side information comprises a receiver precoding information (e.g., UE-side receiver precoding (e.g., for PDSCH reception, or for determining CSI resource, or correlation information of channel, receiver signals or noise), or left singular matrix U (i.e., related to a channel or CSI reference resource)) or the information of eigenvalues Σ. In this example, we focus on receiver (Rx) precoding matrix.

Figure 4:
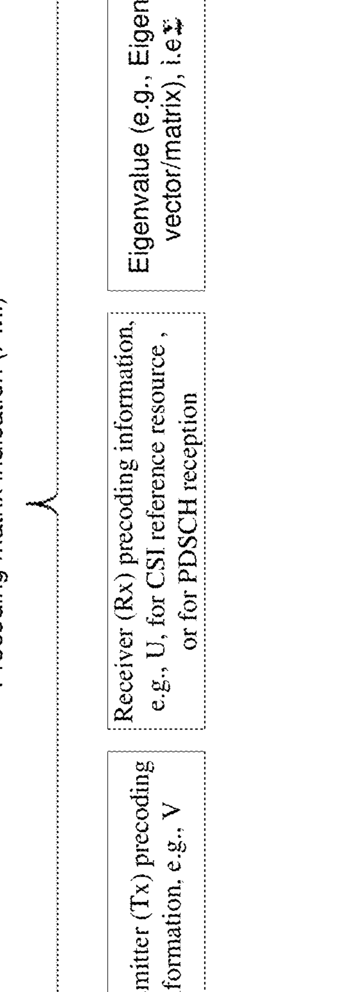
FIG. 4 shows another example RS configuration for CJT CSI report.

In FIG. 4, an example for precoding matrix indication for CJT (further considering Rx precoding matrix and eigenvalues) is provided for presentation.

Receiver precoding information (e.g., UE-side receiver precoding (e.g., for PDSCH reception, or for determining CSI resource resource), and/or the information of eigenvalues is applied to all TRP (i.e., TRP-common), is applied to a given layer (i.e., layer-specific), and is applied to a given transmission hypothesis specific. For instance, the same UE Rx precoding for all TRPs.

Option 1: Each element of receiver precoding information is explicitly reported for and each layer In such case, the elements of receiver precoding information is wideband, wideband+subband or subband-only Elements of receiver precoding information for neighboring sub-band are reported in a differential manner.

For instance, for 2-Rx or 4-Rx UE, the explicit reporting of Rx precoding matrix is efficient, considering that there may be very limited elements. Even considering Type-I or Type-II CSI codebook, the parameters for $W_1/W_2/W_3$ can be turn off in such case.

Furthermore, for elements in a group (e.g., having two elements in a group), Rx precoding is explicitly reported with both amplitude and phase information, and then co-phase information is provided for element of another group.

For instance, the Rx precoding information or Rx correction matrix for 4-Rx is provided as:

$$\begin{bmatrix} v_1 & \ldots & v_l \\ \varphi_1 v_1 & \ldots & \varphi_l v_l \end{bmatrix}$$

where $v_1 \ldots v_1$, and $\varphi_1 \ldots \varphi_l$ are individually reported.

Option 2: The receiver precoding information is based on DFT basis, e.g., DL TypeI codebook, W1.

In such case, the elements of receiver precoding matrix is reported in a wideband, or reported with both wideband and subband information.

Option-3: The receiver precoding information is based on a linear combination of several DFT basis, e.g., DL TypeII codebook, W1W2 or W1W2 $W_F^H$.

For instance, this option is applied to the case that the UE have 4Rx or more.

Furthermore, in the such case, the elements of receiver precoding information is reported in a wideband, or reported with both wideband and subband information.

At least one of the following parameter should be reported in the CSI report:

Basis selection indicator(s)

Quantized combining coefficients (W2)

The coefficient is reported according to predefined alphabets for amplitude and/or phase.

Quantization of phase and quantization of differential amplitude relative to a reference Furthermore, the reference corresponds to an element with strongest coefficient, e.g., in a layer.

Number of non-zero coefficients and bitmap to indicate non-zero coefficients

Strongest coefficient indicator(s) (SCI(s))

Layer indicator (LI)

Furthermore, the antenna architecture information related to receiver can be reported by a capability report or a CSI/RSRP report.

Furthermore, the antenna architecture information comprises at least one of N1, N2, Ng, the number of UE Rx antenna ports.

Furthermore, the antenna architecture can be determined according to parameter for antenna switching (xTyR).

The gNB can configure the number of Rx or number of UE antennas in the CSI report configuration for handing the case of multiple number of xTxR is reported.

At least one of the following parameters can be configured by gNB for accommodating the CJT transmission:

The number of basis vector is configured by a RRC or MAC-CE parameter

The parameter is applied to all TRP or all layer or a given layer

The number of non-zero elements (e.g., for W2)

The candidate list for FD-basis selection, and/or the number of FD-basis (e.g., only two or none)

It should be noticed, considering that channel-delay-related issues can be pre-compensated by FD-basis in Tx-precoding, and then, for receiving perspective, the number of FD-basis may be limited.

Codebook indication is to indicate one codebook

For instance, the codebook indication is to select one codebook from $W_1$-only (DFT-basis), and $W_1 W_2 W_F^H$ (DFT-basis).

CSI mode

Furthermore, the CSI mode comprises at least one of CSI codebook, or explicit report of elements of precoding.

Furthermore, CSI codebooks comprises at least one of CSI Type-I, CSI Type-II, and CSI eType-II.

Furthermore, CSI codebook comprises at least one of DFT-based, linear combination of one or more basis.

For instance, the receiver precoding matrix can be independently reported from UE side, rather than being combined with the transmitter precoding matrix. In such case, the CSI report configuration (e.g., for the receiving precoding) may be associated with another CSI report configuration (e.g., for the transmitter precoding).

Example 3: CSI Report of Eigenvalue

In order to determine DL precoding in MU-MIMO, the complete channel information also includes the information of eigenvalues. So, in this example, we elaborate some solutions for CSI reporting of eigenvalue.

The information of eigenvalue comprising power, amplitude and/or phase information is reported explicitly (e.g., per layer).

Furthermore, the information of eigenvalue(s) is reported with a differential manner in power, amplitude or phase domain.

Furthermore, the information of eigenvalue(s) is reported with a differential manner in a descending order, i.e., the information of {i+1}-th eigenvalue in terms of amplitude is reported according to a differential value and information of i-th eigenvalue.

Furthermore, the reference in the differential manner corresponds to the strongest coefficient.

Furthermore, the layer corresponding to strongest coefficient is assumed for the first layer, e.g., layer-1, or indicated by a layer indication in the CSI report.

Furthermore, the power or amplitude of the strongest coefficient of layer is 1.

For instance, the information of eigenvalues comprises phase information, and the corresponding amplitude is 1, e.g., the eigenvalue of $e^{j\varphi}$ where the information of eigenvalue is the phase information $\varphi$.

For instance, the information of eigenvalues comprises phase and amplitude information. The amplitude information is reported in a differential manner in a descending order, which means that co-efficient of each layer is also in a descending order.

Furthermore, layer-specific mapping or association between receiver side information and transmitter precoding matrix can be indicated in the CSI report.

Furthermore: The eigenvalue or eigenvalue matrix is determined/assumed according to a fixed value or an identify matrix.

For instance, the eigenvalue for each layer is 1.

Example 4: CSI Corresponding to Different Transmission Hypotheses

For multi-TRP, there may be up to 4 or more TRP operation for CJT, and we recommend a flexible configuration/report mechanism for different transmission hypothesis, e.g., sTRP, 2-TRP, 3-TRP or more for serving CJT.

The UE reports one or more CSI corresponding to different transmission hypotheses in the CSI report.

For a transmission hypothesis, the RS resource group or RS port group combination are gNB-configured via higher-layer (RRC) signaling.

At least one or combination of the maximum number of resources in a RS resource group, maximum number of port groups in a RS resource group or maximum number of port groups (e.g., corresponding to number of TRPs for a CSI transmission hypothesis) can be reported by UE capability signaling.

Furthermore, TRP is equivalent to a RS port, a RS port group, RS resource, or a RS resource set.

For instance, the UE can report the support of {1-TRP, 2-TRP, 3-TRP} based CJT CSI, and then the two RS resources (corresponding to 2 TRP) can be configured for CJT CSI measurement and report.

Furthermore, the TRP-group can be RRC configured, e.g., through a RS resource.

Furthermore, when more than one TRP or TRP-group is configured in report configuration, the UE can indicate CSI report for one or more TRPs or one or more TRP groups.

Then, in a CSI report configuration, the gNB can configure a parameter of indicating the respective numbers of CSI corresponding to one or more given transmission hypotheses.

For instance, the gNB can configure the CSI reporting configuration of indicating: 1 CSI corresponding to 2 RS resources (e.g., 2-TRP) and 1 CSI corresponding to 1 RS resource (i.e., a single TRP) to be reported.

For instance there are two RS resources (i.e., two TRP groups), each of which refers to one or two RS port groups (i.e., two TRPs in a group). Then in such case, the UE can be report CSI for a single RS resource (i.e., corresponds to two RS port groups) or two RS resources (i.e., for two TRP groups, and up to 4 TRPs in total).

Furthermore, the CSI processing unit (CPU) corresponding to each type of transmission hypothesis (the number of CSI-RS resources for CSI determination) are up to UE capability report, the number of RS resources in a RS resource group, or the number of RS port groups in a RS resource or a RS resource group. For instance, the CPU for the number of CSI-RS resources for CSI determination is determined according to the number of CSI-RS resources (i.e., the number of CSI-RS resources, or the number of CSI-RS resources+1).

Figure 5:
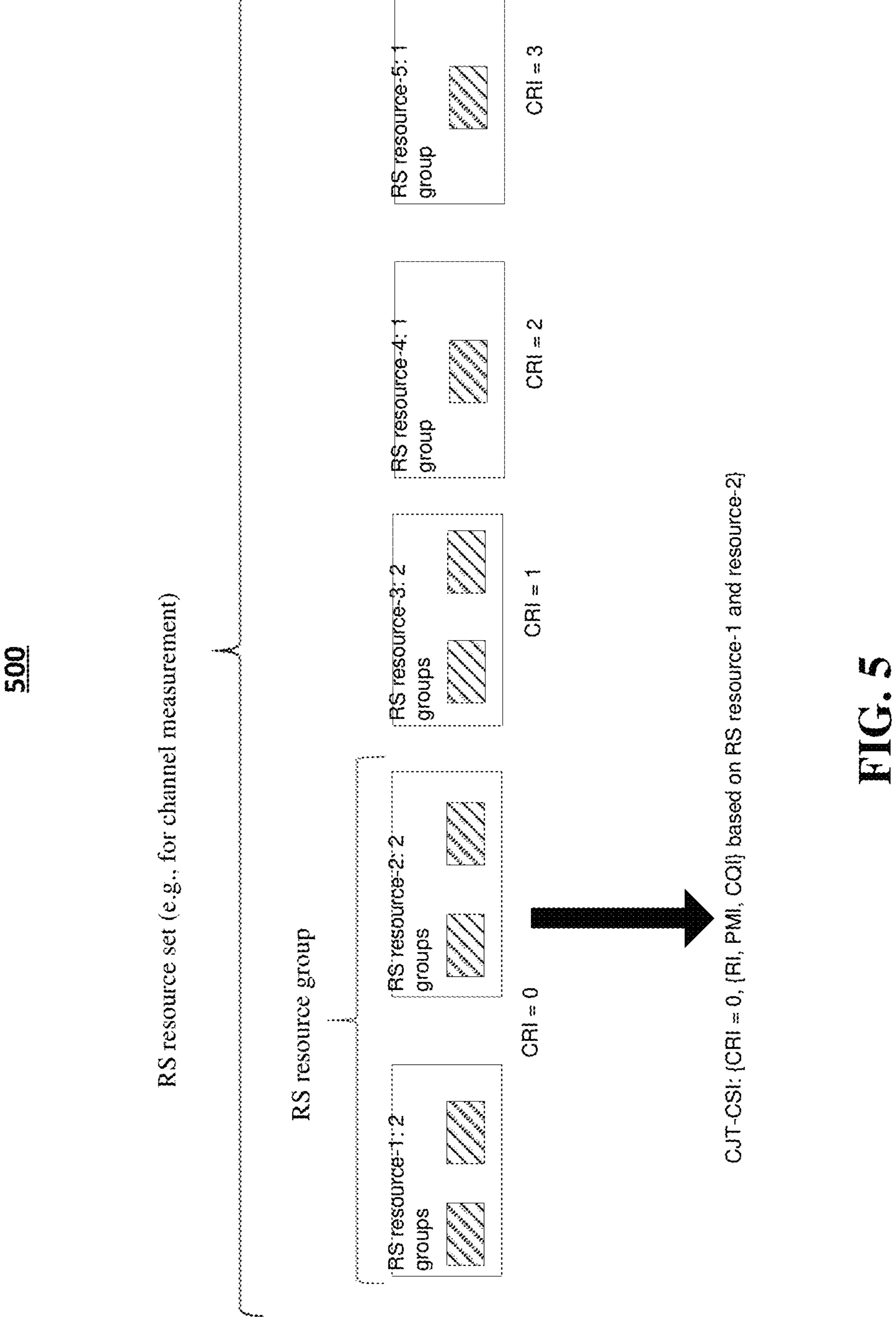
FIG. 5 shows an example a CJT CSI report for a multi-TRP transmission hypotheses.

For instance, there are RS resource sets comprising 1 RS resource group and 3 RS resources as shown in FIG. 5. For RS resource group, there are two RS resources, each of which comprises two RS port groups. Then, for RS resource 3, there are two port groups corresponding two respective TRPs. But, in RS resource-4 and 5, there is a single port groups. It should be noticed that the RS resource group and other RS resources are joint numbered.

In such case, UE may report its capability of supporting up to 4 TRPs in CJT-CSI measurement and report. Meanwhile, it can support up to 2 port groups in a RS resources, and then up to 2 RS resources.

The CPU occupation for 4TRP, 3TRP and 2TRP is reported separately, e.g., 7, 5, and 3 occupied CPUs.

Based on RS measurement, the UE report the CRI=0, and {RI, PMI and CQI} based on RS resource 1 and RS resource-2 to gNB side.

In this disclosure, under a flexible RS configuration framework (for dynamical switching between TRP-specific, TRP-group-specific and TRP-common), we recommend an additional report mechanism of providing the UE receiver side information by per RX reporting or per layer, i.e., information related to the left singular matrix U of the channel, $H=U\Sigma V^H$, and eigenvalue(s) (i.e., $\Sigma$), which can significantly mitigate inter-UE interference in MU-MIMO. After that, for multi-TRP case, there may be up to 4 or more TRP operation for CJT, and we recommend a flexible configuration/report mechanism for different transmission hypothesis, e.g., sTRP, 2-TRP, 3-TRP or more for serving CJT under a given TRP Tx power.

Figure 6:
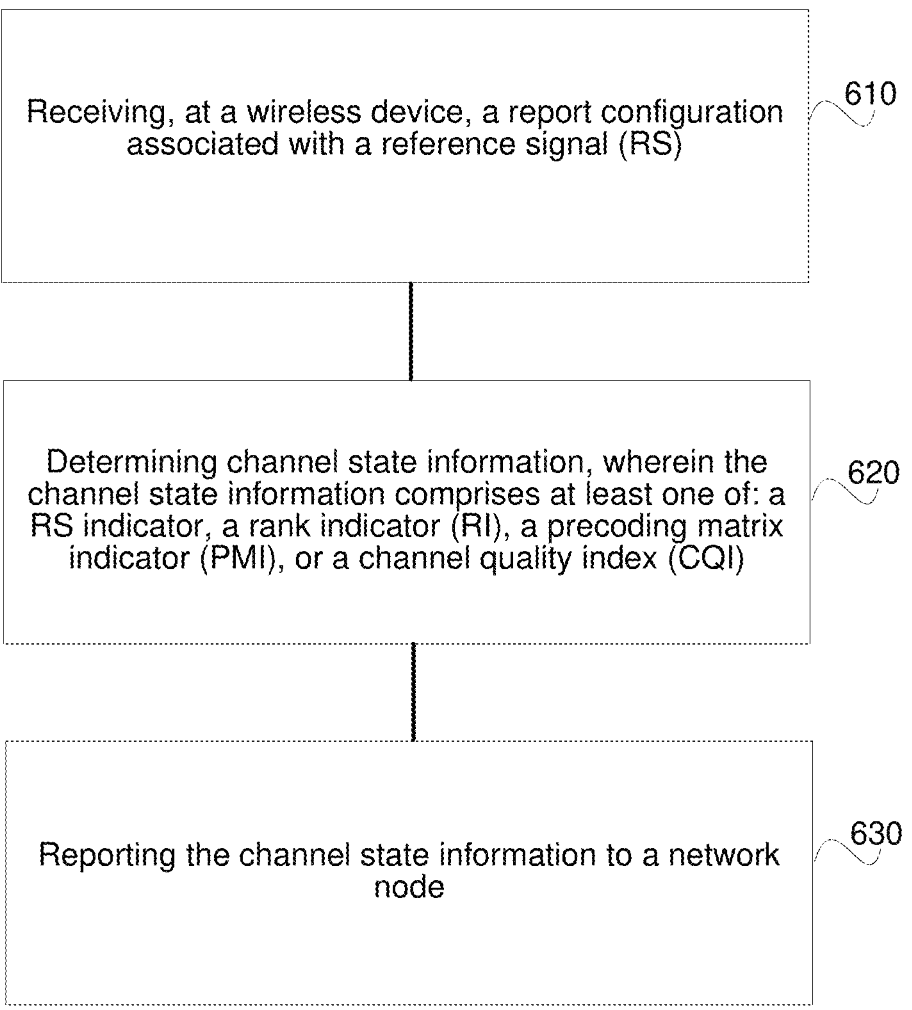
FIG. 6 shows an example of a process.

FIG. 6 depicts an example of a method of wireless communication 600, in accordance with some example embodiments. At 610, the method includes receiving, at a wireless device, a report configuration associated with a reference signal (RS). At 620, the method includes determining channel state information, wherein the channel state information comprises at least one of: a RS indicator, a rank indicator (RI), a precoding matrix indicator (PMI), or a channel quality index (CQI). At 630, the method includes reporting the channel state information to a network node FIG. 7 depicts an example of a method of wireless communication 600, in accordance with some example embodiments. At 710, the method includes transmitting, from a network node to a wireless device, a report configuration associated with a reference signal (RS). At 720, the method includes receiving, at the network node from the wireless device, channel state information wherein the channel state information comprises at least one of: an RS indicator, a rank indicator (RI), a precoding matrix indicator (PMI), or a channel quality index (CQI).

Figure 8:
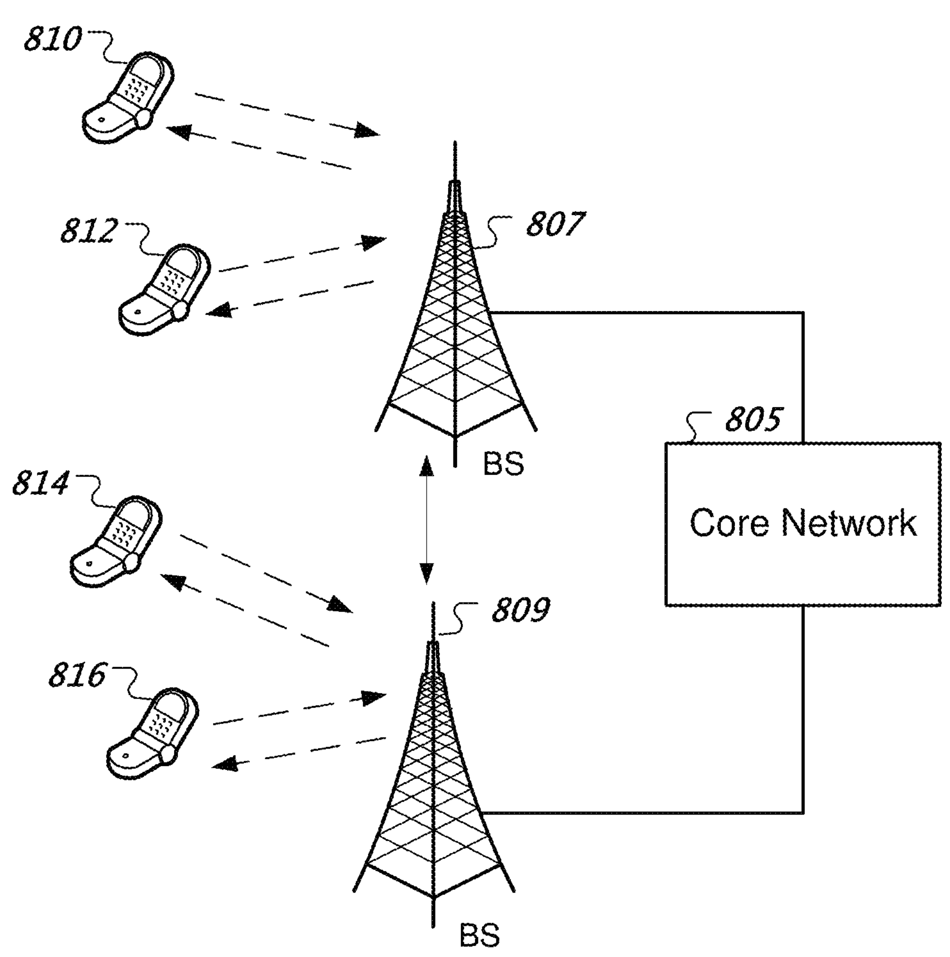
FIG. 8 shows an example of a system.

FIG. 8 shows an example of a wireless communication system (e.g., a 5G or NR cellular network) that includes one or more base stations 807, 809 and one or more user equipment (UE) 810, 812, 814 and 816. In some embodiments, the UEs access the BS and core network 805 (e.g., the network) using a communication link to the network (sometimes called uplink direction, as depicted by dashed arrows pointing toward a base station), which then enables subsequent communication. In some embodiments, the BS sends information to the UEs (sometimes called downlink direction, as depicted by arrows from the base stations to the UEs), which then enables subsequent communication between the UEs and the BSs, shown by dashed arrows between the UEs and the BSs.

Figure 9:
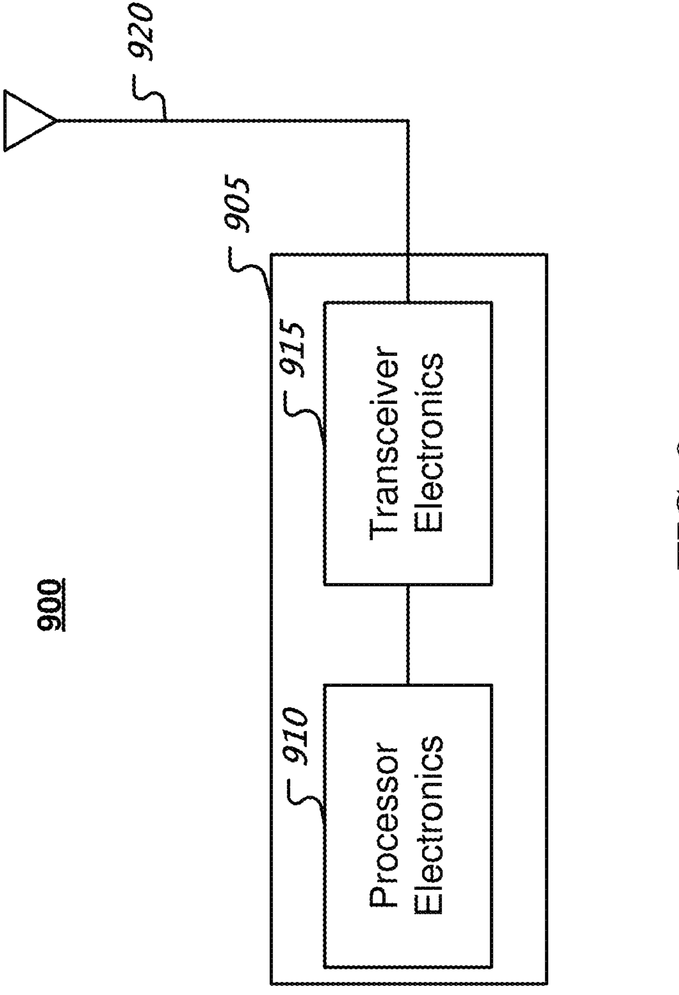
FIG. 9 shows an exemplary block diagram of a hardware platform that may be a part of a network node or a communication device.

FIG. 9 shows an exemplary block diagram of a hardware platform 900 that may be a part of a network node (e.g., base station) or a communication device (e.g., a wireless device such as a user equipment (UE)). The hardware platform 900 includes at least one processor 910 and a memory 905 having instructions stored thereupon. The instructions upon execution by the processor 910 configure the hardware platform 900 to perform the operations described in FIGS. 1 to 8 in the various embodiments described in this patent document. The transceiver 915 transmits or sends information or data to another device. For example, a wireless device transmitter as part of transceiver 915 can send a message to a user equipment via antenna 920. The transceiver 915 receives information or data transmitted or sent by another device via antenna 920. For example, a wireless device receiver as part of transceiver 915 can receive a message from a network device via antenna 920.

The Following Clauses Reflect Features of Some Preferred Embodiments

Clause 1. A method of wireless communication, comprising: receiving, at a wireless device, a report configuration associated with a reference signal (RS); determining channel state information, wherein the channel state information comprises at least one of: a RS indicator, a rank indicator (RI), a precoding matrix indicator (PMI), or a channel quality index (CQI); and reporting the channel state information to a network node.

Clause 2. A method of wireless communication, comprising: transmitting, from a network node to a wireless device, a report configuration associated with a reference signal (RS); and receiving, at the network node from the wireless device, channel state information wherein the channel state information comprises at least one of: an RS indicator, a rank indicator (RI), a precoding matrix indicator (PMI), or a channel quality index (CQI).

Clause 3. The method of wireless communication of clauses 1 or 2, wherein the RS comprises one or more RS resource groups for channel measurement, or one or more interference measurement resources (IMRs).

Clause 4. The method of wireless communication of clause 3, wherein at least one of the one or more RS resource groups comprises one or more RS resources, and wherein at least one of the one or more RS resources comprises one or more port groups.

Clause 5. The method of wireless communication of clauses 1 or 2, wherein the PMI includes a spatial domain (SD) basis indication.

Clause 6. The method of wireless communication of clause 5, wherein the SD basis indication is associated with one port group, one or more port groups in one RS resource, or one or more resources in one RS resource group, whether the SD basis indication is provided per RS port group or per RS resource, is determined according to a RRC parameter or a MAC-CE parameter, when a RS resource group comprises only one RS resource, the SD basis indication is provided per RS port group, or when a RS resource group comprises more than one RS resources, the SD basis indication is provided per RS resource.

Clause 7. The method of wireless communication of clauses 1 or 2, wherein the PMI includes a frequency domain (FD) basis indication Clause 8. The method of wireless communication of clause 7, wherein the FD basis indication is associated with one port group, one or more port groups in one RS resource, or one or more resources in one RS resource group, whether the FD basis indication is provided per RS resource group or per RS resource, and the FD basis indication is determined according to a RRC parameter or a MAC-CE parameter, when a RS resource group comprises only one RS resource, the FD basis indication is provided per RS port group or per RS resource, or when a RS resource group comprises more than one RS resources, the FD basis indication is provided per RS resource or per RS resource group.

Clause 9. The method of wireless communication of clause 4, wherein a port group is determined according to a parameter of the number of port groups, Ng, or a combination of the number of port groups (Ng) and a number of first domain ports (N1) and a number of second domain ports (N2).

Clause 10. The method of wireless communication of clause 9, wherein the parameter or the combination is configured per RS resource or in a RS resource set.

Clause 11. The method of wireless communication of clause 9, wherein a same parameter or a same combination, Ng, N1, or N2, is for one or more RS resources in the RS resource set or in the RS resource group.

Clause 12. The method of wireless communication of clauses 1 or 2, wherein the channel state information is associated with receiver side information.

Clause 13. The method of wireless communication of clause 12, wherein the receiver side information is: associated with a RS resource group, associated with a transmission resource group, provided per layer, applied to all layers, or applied to a given transmission hypothesis.

Clause 14. The method of wireless communication of clause 12, wherein the receiver side information comprises a receiver precoding information, or a left singular matrix, U, or eigenvalue information.

Clause 15. The method of wireless communication of clause 14, wherein each element of the receiver precoding information is provided for one layer.

Clause 16. The method of wireless communication of clause 14, wherein the receiver precoding information comprises a subband information, wherein the subband information is determined according to a difference value between a reference receiver precoding information and the receiver precoding information of a subband, and wherein the reference receiver precoding information is determined according to wideband information or subband information of a reference subband.

Clause 17. The method of wireless communication of clause 16, wherein the reference subband is indicated by: a parameter carried in the CSI, a first subband with strongest coefficient, a first subband, or a second subband with a specific index comprising at least one of highest index, lowest index, zero, or one.

Clause 18. The method of wireless communication of clause 14, wherein the receiver precoding information comprises amplitude and phase information for one or more elements of an element group, and wherein co-phase information is provided for elements of another group.

Clause 19. The method of wireless communication of clause 14, wherein the receiver precoding information is based on a discrete Fourier transform (DFT) basis.

Clause 20. The method of wireless communication of clause 14, wherein the receiver precoding information is based on a linear combination of multiple DFT bases.

Clause 21. The method of wireless communication of clause 12, wherein the receiver precoding information corresponds to wideband information, subband information, or wideband and subband information.

Clause 22. The method of wireless communication of clause 12, wherein the receiver precoding information includes one or more of: a basis indicator, a coefficient, wherein the coefficient is reported according to a reference coefficient or an alphabet for amplitude or phase, a number of non-zero coefficients or a bitmap to indicate non-zero coefficients, a strongest coefficient indicator, a reference coefficient indicator, or a layer indicator.

Clause 23. The method of wireless communication of clause 1, further comprising:

reporting, at a wireless device, a capability report or a channel state information, wherein the capability report or channel state information includes at least one of: antenna architecture information, a maximum number of resources in a reference signal resource group, a maximum number of port groups in a reference signal resource group, or the maximum number of port groups.

Clause 24. The method of wireless communication of clause 2, further comprising: receiving, at a network node, a capability report or a channel state information, wherein the capability report or channel state information includes at least one of: antenna architecture information, a maximum number of resources in a reference signal resource group, a maximum number of port groups in a reference signal resource group, or the maximum number of port groups.

Clause 25. The method of wireless communication of clause 23 or 24, wherein the antenna architecture information is determined according to an antenna switching parameter or an SRS port parameter wherein antenna architecture, or the antenna architecture information comprises at least one of: a number of receiver antenna ports, a number of first domain receiver antenna ports, a number of second domain receiver antenna ports, or a number of receiver port groups.

Clause 26. The method of wireless communication of clauses 1 or 2, wherein the report configuration comprises a number of receiver antenna reports associated with the channel state information.

Clause 27. The method of wireless communication of clause 11, wherein, for reporting receiver side information, the report configuration comprises: a number of bases; a number of non-zero elements; a candidate list for frequency domain (FD) basis selection; a number of FD bases associated with the receiver side information; a codebook indication; or a channel state information mode.

Clause 28. The method of wireless communication of clause 27, further comprising:

configuring, by a radio resource control (RRC) or a media access control control element (MAC-CE), the number of basis vectors; applying the number of basis vectors to a RS resource group, a transmission resource group or all layers, or determining or indicating the number of basis vectors per layer.

Clause 29. The method of wireless communication of clause 13 or 28, wherein the transmission resource group comprises a beam state, a reference signal port, a reference signal port group, a reference signal resource, a reference signal resource group, or a reference signal resource set.

Clause 30. The method of wireless communication of clause 14, wherein the eigenvalue information comprises power, amplitude, or phase information.

Clause 31. The method of wireless communication of clause 30, wherein the eigenvalue information is generated differentially in power, amplitude, and phase information.

Clause 32. The method of wireless communication of clause 31, wherein the eigenvalue information is generated differentially in descending manner including the information of an {i+1}-th eigenvalue in terms of amplitude is generated according to a differential value and information of an i-th eigenvalue.

Clause 33. The method of wireless communication of clause 31, wherein a differential reference comprises a reference coefficient, wherein the reference coefficient comprises at least one of: a strongest coefficient; a first coefficient; or a coefficient with a specific index comprising a highest index, lowest index, zero, or one.

Clause 34. The method of wireless communication of clause 33, wherein the layer corresponding to the reference coefficient is the first layer or indicated by a layer indication in the channel state information report.

Clause 35. The method of wireless communication of clause 12, wherein a layer-specific mapping or an association between receiver side information and transmitter precoding information is indicated in the channel state information report.

Clause 36. The method of wireless communication of clause 14, wherein the eigenvalue information is determined according to a fixed value or an identify matrix.

Clause 37. The method of wireless communication of clauses 1 or 2, wherein the channel state information (CSI) is associated with a transmission hypothesis.

Clause 38. The method of wireless communication of clause 37, wherein in a transmission hypothesis, the RS resource group or RS port group combination are configured by a radio resource control (RRC) or a media access control control element (MAC-CE).

Clause 39. The method of wireless communication of clause 38, wherein, in a CSI report, respective numbers of CSI corresponding to one or more given transmission hypotheses can be indicated in the report configuration.

Clause 40. The method of wireless communication of clause 37, wherein the CSI processing unit (CPU) corresponding to one type of transmission hypothesis a RS resource group is determined according to at least one of: a UE capability signaling, the number of RS resources in a RS resource group, or the number of RS port groups in a RS resource or a RS resource group.

Clause 41. A wireless communication apparatus, comprising a processor configured to implement a method recited in any one or more of clauses 1 to 40.

Clause 42. A computer program product having code stored thereon, the code, when executed by a processor, causing the processor to implement a method recited in any one or more of clauses 1 to 40.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

The invention claimed is:

1. A method of wireless communication implemented at a wireless device that is configured to provide a spatial domain (SD) basis indication and a frequency domain (FD) basis indication in channel state information (CSI), comprising:

reporting, by the wireless device to a network node, a capability report that includes at least a maximum number of resources in a reference signal (RS) resource group associated with a report configuration;

receiving, by the wireless device from the network node, the report configuration that is associated with the RS resource group for channel measurement;

determining, by the wireless device, CSI, wherein the CSI comprises a precoding matrix indicator (PMI), wherein the PMI includes the SD basis indication that is associated with a resource in the RS resource group and the FD basis indication that is applied to each resource in the RS resource group including more than one resource; and reporting, by the wireless device to the network node, the CSI.

2. The method of claim 1, wherein the capability report or the channel state information comprises at least one of: a maximum number of resources in the RS resource group, a maximum number of port groups in the RS resource group, or a maximum number of port groups.

3. The method of claim 1, wherein a CSI processing unit (CPU) for determining the CSI is determined according to a UE capability signaling, and a number of RS resources in the RS resource group.

4. The method of claim 1, wherein the channel state information is associated with at least one of: a RS resource group, a transmission resource group, a layer, all layers, or a transmission hypothesis.

5. A method of wireless communication implemented at a network node that is configured to process a spatial domain (SD) basis indication and a frequency domain (FD) basis indication in channel state information (CSI), comprising:

receiving, by the network node from a wireless device, a capability report that includes at least a maximum number of resources in a Reference Signal (RS) resource group associated with a report configuration;

transmitting, from a network node to the wireless device, the report configuration that is associated with the RS resource group for channel measurement; and receiving, by the network node from the wireless device, the CSI, wherein the CSI comprises a precoding matrix indicator (PMI), wherein the PMI that includes a spatial domain (SD) basis indication that is associated with a resource in the RS resource group and a FD basis indication that is applied to each resource in the RS resource group including more than one resource.

6. The method of claim 5, wherein the capability report or the channel state information comprises at least one of: a maximum number of resources in the RS resource group, a maximum number of port groups in the RS resource group, or a maximum number of port groups.

7. The method of claim 5, wherein a CSI processing unit (CPU) for determining the CSI is determined according to a UE capability signaling and a number of RS resources in the RS resource group.

8. The method of claim 5, wherein the channel state information is associated with at least one of: a RS resource group, a transmission resource group, a layer, all layers, or a transmission hypothesis.

9. A wireless communication apparatus, comprising at least one processor configured to cause the wireless communication apparatus to:

provide a spatial domain (SD) basis indication and a frequency domain (FD) basis indication in channel state information (CSI);

report to a network node a capability report, wherein the capability report includes at least a maximum number of resources in a reference signal (RS) resource group associated with a report configuration;

receive from the network node the report configuration that is associated with the RS resource group for channel measurement;

determine CSI, wherein the CSI comprises a precoding matrix indicator (PMI), wherein the PMI includes the SD basis indication that is associated with a resource in the RS resource group and the FD basis indication that is applied to each resource in the RS resource group including more than one resource; and report the CSI to the network node.

10. The apparatus of claim 9, wherein the capability report or the channel state information comprises at least one of: a maximum number of resources in the RS resource group, a maximum number of port groups in the RS resource group, or a maximum number of port groups.

11. The apparatus of claim 9, wherein a CSI processing unit (CPU) for determining the CSI is determined according to a UE capability signaling and a number of RS resources in the RS resource group.

12. The apparatus of claim 9, wherein the channel state information is associated with at least one of: a RS resource group, a transmission resource group, a layer, all layers, or a transmission hypothesis.

13. A wireless communication apparatus, comprising at least one processor configured to cause the wireless communication apparatus to:

process a spatial domain (SD) basis indication and a frequency domain (FD) basis indication in channel state information (CSI);

receive, from a wireless device, a capability report that includes at least a maximum number of resources in a Reference Signal (RS) resource group associated with a report configuration;

transmit, to the wireless device, the report configuration associated with the reference signal (RS) resource group for channel measurement; and receive, from the wireless device, the CSI, wherein the CSI comprises a precoding matrix indicator (PMI), wherein the PMI includes a spatial domain (SD) basis indication associated with a resource in the RS resource group and a FD basis indication that is applied to each resource in the RS resource group including more than one resource.

14. The apparatus of claim 13, wherein the capability report or the channel state information comprises at least one of: a maximum number of resources in the RS resource group, a maximum number of port groups in the RS resource group, or a maximum number of port groups.

15. The apparatus of claim 13, wherein a CSI processing unit (CPU) for determining the CSI is determined according to a UE capability signaling and a number of RS resources in the RS resource group.

16. The apparatus of claim 13, wherein the channel state information is associated with at least one of: a RS resource group, a transmission resource group, a layer, all layers, or a transmission hypothesis.

* * * * *